May 12, 1931. G. E. ROWE 1,805,430

CHAIN CONVEYER

Filed Feb. 6, 1928

Inventor:
George E. Rowe.
by Robson & Brown
Attorney.

Patented May 12, 1931

1,805,430

UNITED STATES PATENT OFFICE

GEORGE E. ROWE, OF WEST HARTFORD, CONNECTICUT, ASSIGNOR TO HARTFORD-EMPIRE COMPANY, OF HARTFORD, CONNECTICUT, A CORPORATION OF DELAWARE

CHAIN CONVEYER

Application filed February 6, 1928. Serial No. 252,127.

The object of my invention is to provide a conveyer having a strong supporting surface and capable of turning around a curve in the same plane as the conveyer. As ordinarily constructed, a chain conveyer is capable of very little flexure in its own plane, but by the novel means hereinafter described, I have made a chain conveyer capable of flexure in its own plane which permits its use in conveying articles, such as glass bottles, in a curved path. Such construction often has great utility in factories in which space is limited as it permits the continuous delivery of articles from one point to another through the most available path.

Figure 1:
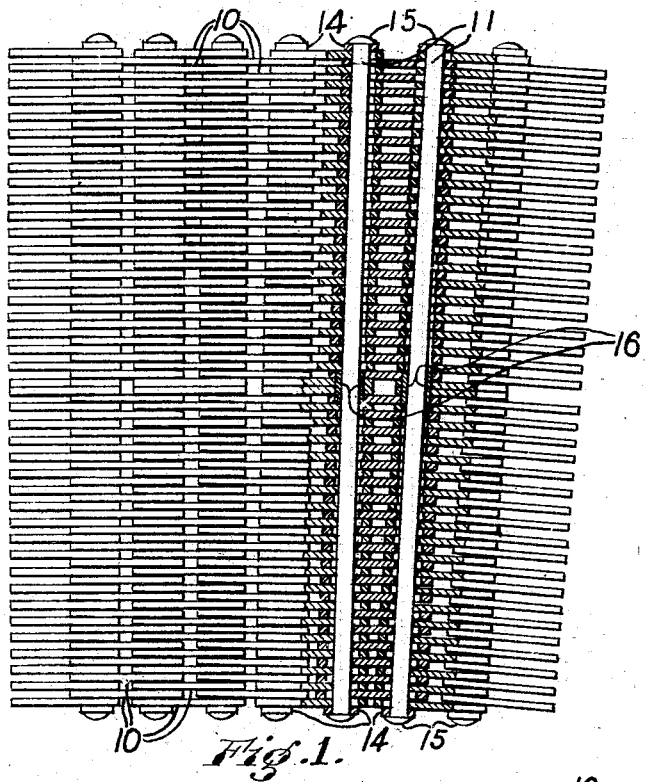
Figure 3:
Figure 4:
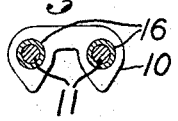
Figure 5:
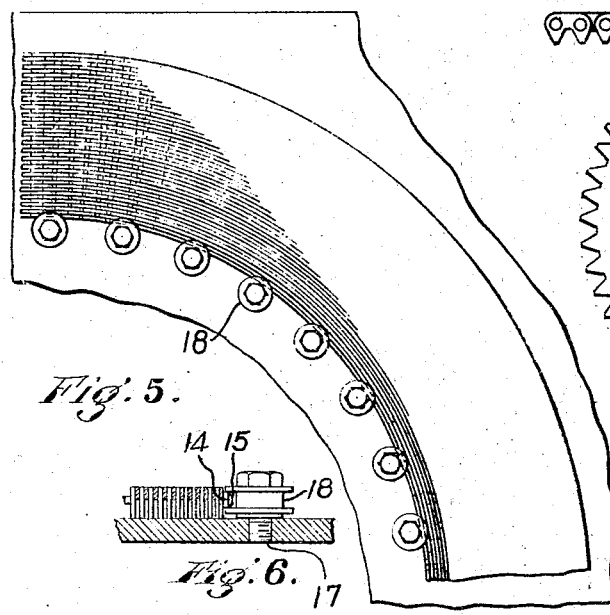
Figure 6:
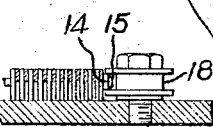
Figure 2:
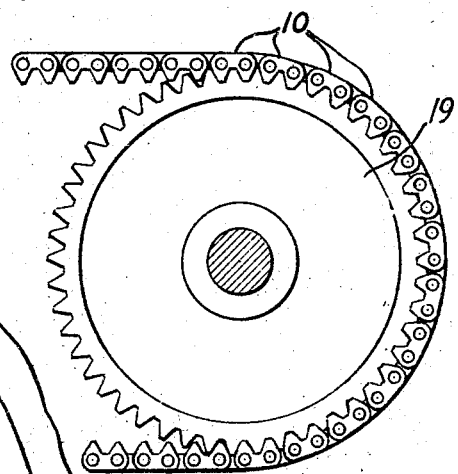

In order to more clearly explain my invention, I have shown one embodiment thereof in the accompanying drawings, in which Figure 1 is a plan view of a chain conveyer partly in section, Fig. 2 is a side elevational view of the chain conveyer passing over a sprocket, Fig. 3 is a side view of one of the outer links with the connecting rods in section, Fig. 4 is a side view of one of the middle links showing the connecting rods and bearing bushings in section, Fig. 5 is a more or less diagrammatic view showing the chain conveyer passing around a curve in its own plane, and Fig. 6 is a side elevation of the guide spool used around curves, certain parts being shown in section.

Chain links 10 of the usual form are held together by connecting rods 11 passing through apertures 13 provided in the ends of the links. These apertures are of greater diameter than that of the rod (Fig. 3) to provide a certain amount of lost motion. A sufficient number of links are assembled side by side to provide a conveyer of the desired width, washers 14 are slipped over the ends of the rods and the ends of the rods are then headed over to hold the washers in place. The rods 11 are a little longer than the combined thickness of the links which they hold in place so as to provide a certain amount of lost motion longitudinally of the rod.

By referring to Fig. 1, it will be seen that the upper links can be pulled a little farther apart, and the lower links pushed a little closer together because of the lost motion provided between the connecting rods and the apertures in the links and thus the conveyer, as a whole, may be bent around a curve lying in its own plane.

I have also found it desirable to reduce or substantially eliminate lost motion in a few of the links near the middle of the conveyer and maintain the proper pitch spacing along these links. It is particularly important to have this proper pitch spacing when the conveyer is passing over the sprocket 19, as shown in Fig. 2. As shown in Figs. 1 and 4, bearing bushings 16 with outer diameters equal to that of the apertures and inner diameters substantially equal to that of the rod and lengths slightly longer than the combined thickness of four links are used for that purpose. To prevent longitudinal displacement of this bushing, it is preferably swaged outwardly at each end around the two outside links of the middle group to hold them in place. In the construction shown, this swaging holds the outer links rigid with the bushings and prevents rotation therebetween. The inner links of each set rotate freely around the bushing and have a slight amount of lost motion with respect to the bushing in order to facilitate the lateral flexure of this part of the conveyer.

Inasmuch as the conveyer may be driven through the links supported by bearing bushings 16, it is not necessary that the outer links have sprocket engaging teeth, although for simplicity in manufacture, it is sometimes desirable that all links be made alike.

While the driving links are shown in the middle of the conveyer, and this arrangement seems preferable, it is obvious that such an arrangement is not essential for operativeness, as the driving links may be located away from the center of the conveyer, or even at one side thereof.

Where the conveyer passes around an arc in its own plane, means should be provided for keeping the conveyer in its proper course. While various methods of doing this are available, one way is shown in Fig. 6 where spool rollers 18 are used to provide a guide for the conveyer along its inner side. There is little or no tendency for the belt to move outwardly so that the rollers 18 are provided at the inner side only. A shouldered bolt or stud 17 provides a journal for the spool rollers 18. The cutaway portion of the spool is to permit the washers 14 and the protruding ends of the rods 15 to pass into this space so that the bearing surface is on the links and not on these projections.

It is to be understood that the embodiment of the invention shown above is for the purpose of illustration only, and various modifications may be made therein without departing from the spirit and the scope of the invention, as defined in the appended claims.

I claim as my invention:

1. In a chain conveyer, a plurality of connecting links having apertures in each end thereof, connecting rods of a less diameter than said apertures for holding the links side by side, and bushings for reducing the lost motion between rods and apertures at the middle of the rod.

2. A chain conveyer comprising a plurality of links with apertures in each end thereof, connecting rods of less diameter than said apertures for holding said links side by side, and bearing bushings at the middle of said rod with outer diameters equal to the apertures and inner diameters equal to the rod.

3. A chain conveyer comprising a plurality of links with apertures in each end thereof, connecting rods of less diameter than said apertures for holding said links side by side, and bearing bushings at the middle of said rod with outer diameters equal to the apertures and inner diameters approximately equal to the rod, the length of said rods being great enough to provide longitudinal lost motion.

4. A chain conveyer comprising a plurality of transverse connecting rods, a plurality of links held side by side forming the ware bearing surface and pivotally connected with said rods to provide for flexure of said conveyer about the axes of said rods, certain of said links loosely fitting said rods to provide lateral flexure of said conveyer.

5. A glassware conveying belt structure comprising a plurality of links, each link having an aperture at each end thereof, and connecting rods passing through the said apertures, some of the apertures being elongated relative to the diameter of the connecting rods and longitudinally of the links, the links being provided with ware supporting surfaces, the connecting rods being contained wholly beneath the said supporting surfaces, and a substantial number of said links being held in side by side relationship by the connecting rods, whereby the conveyer belt is of substantial width and is capable of flexure, both about an axis extending transversely of said conveyer and about an axis perpendicular to said first-named axis.

6. A conveyer for glassware comprising rigid links forming a ware bearing surface and assembled in rows transversely of the conveyer, means for assembling the links and for connecting the rows thereof and providing relative movement between rows, whereby the belt is adapted for flexure both about an axis extending transversely of the bearing surface of the belt and about an axis perpendicular to such surface.

7. A conveyer for glassware comprising rigid links forming a ware bearing surface, said links being assembled in rows transversely of the conveyer, means for assembling the links and for connecting the rows thereof, and providing relative movement between rows whereby the conveyer is adapted for flexure about an axis extending transversely of the ware bearing surface and about an axis perpendicular to such surface, means for driving the conveyer, and means for flexing the conveyer about the second-named axis to cause the conveyer to travel in a curved path.

8. A chain conveyer comprising a plurality of links with apertures in the ends thereof and connecting rods passing through said apertures of adjacent links, said apertures in the links adjacent the longitudinal medium line of the conveyer having a diameter substantially equal to that of said connecting rod and those in the links most remote from said longitudinal median line having a greater diameter than that of said connecting rod, whereby the links remote from said longitudinal median line may have a lost motion relative to said rod.

Signed at Hartford, Connecticut, this 3rd day of February, 1928.

GEORGE E. ROWE.